(12) United States Patent
Holcombe et al.

(10) Patent No.: US 8,569,679 B2
(45) Date of Patent: Oct. 29, 2013

(54) SYSTEM AND CIRCUIT INCLUDING MULTIPLE PHOTO DETECTORS AND AT LEAST ONE OPTICAL BARRIER

(75) Inventors: Wayne T. Holcombe, Mountain View, CA (US); Miroslav Svajda, San Jose, CA (US)

(73) Assignee: Silicon Laboratories Inc., Austin, TX (US)

( * ) Notice: Subject to any disclaimer, the term of this patent is extended or adjusted under 35 U.S.C. 154(b) by 409 days.

(21) Appl. No.: 12/948,615

(22) Filed: Nov. 17, 2010

(65) Prior Publication Data

US 2011/0248151 A1 Oct. 13, 2011

Related U.S. Application Data

(60) Provisional application No. 61/323,798, filed on Apr. 13, 2010.

(51) Int. Cl.
*G06M 7/00* (2006.01)
(52) U.S. Cl.
USPC .......................................... 250/221; 250/216
(58) Field of Classification Search
USPC ............... 250/221, 222.1, 216; 340/555–557; 348/143, 152; 382/103, 107
See application file for complete search history.

(56) References Cited

U.S. PATENT DOCUMENTS

| | | | |
|---|---|---|---|
| 3,426,198 A | 2/1969 | Autrey | |
| 3,703,718 A | 11/1972 | Berman | |
| 4,059,764 A | 11/1977 | Belasco | |
| 4,207,466 A | 6/1980 | Drage | |
| 4,225,786 A | 9/1980 | Perlman | |
| 4,686,373 A | 8/1987 | Tew | |
| 4,733,081 A | 3/1988 | Mizukami | |
| 5,021,663 A | 6/1991 | Hornbeck | |
| 5,049,751 A | 9/1991 | Yoshida | |
| 5,122,881 A | 6/1992 | Nishizawa | |
| 5,391,875 A | 2/1995 | Cederberg | |
| 5,423,554 A | 6/1995 | Davis | |
| 5,454,043 A | 9/1995 | Freeman | |
| 5,581,276 A | 12/1996 | Cipolla | |
| 5,675,150 A | 10/1997 | Kunz | |
| 5,757,008 A | 5/1998 | Akagawa | |
| 5,767,842 A | 6/1998 | Korth | |

(Continued)

OTHER PUBLICATIONS

Sharp Electronic Components, Compact Distance Measuring Sensors, Data Sheet, Dec. 2006, 4 pages, GP2Y0D340K, Sharp Corporation, Osaka, Japan.

(Continued)

*Primary Examiner* — Francis M Legasse, Jr.
(74) *Attorney, Agent, or Firm* — Cesari & Reed, LLP; R. Michael Reed

(57) ABSTRACT

A system includes a plurality of photo detectors, which generate signals proportional to incident light. The system further includes an optical barrier adjacent to a surface and includes a control circuit. The optical barrier partially obstructs reflected light from reaching the plurality of photo detectors to produce a spatially dependent reflectance pattern that is dependent on a position of an object relative to a substrate. The control circuit determines a position of the object during a reflectance measurement cycle using each of the plurality of photo detectors by calibrating to ambient light conditions, measuring ambient plus reflected light, determining the reflected light and detecting the position of the object based on a ratio of the reflected light received by at least two of the plurality of photo detectors.

22 Claims, 12 Drawing Sheets

(56) References Cited

U.S. PATENT DOCUMENTS

| | | | |
|---|---|---|---|
| 6,107,630 | A | 8/2000 | Mazurowski |
| 6,128,003 | A | 10/2000 | Smith |
| 6,804,396 | B2 | 10/2004 | Higaki |
| 6,829,370 | B1 | 12/2004 | Pavlidis |
| 6,919,567 | B2 | 7/2005 | Iwasawa |
| 7,187,505 | B2 | 3/2007 | Claytor |
| 7,482,666 | B2 | 1/2009 | Holcombe |
| 2004/0252867 | A1 | 12/2004 | Lan |
| 2008/0006762 | A1* | 1/2008 | Fadell et al. ............... 250/201.1 |

OTHER PUBLICATIONS

Sharp Electronic Components, Distance Measuring Sensor Unit Digital Output (400 mm) Type, Data Sheet, Dec. 1, 2006, 9 pages, GP2Y0D340K, Sharp Corporation, Osaka, Japan.

Christian Metzger, Matt Anderson, and Thad Starner, FreeDigiter: A Contact-Free Device for Gesture Control, 2004, 4 pages, ISWC04, Swiss Federal Institute of Technology, Electronics Laboratory, Zurich, Switzerland.

* cited by examiner

SYSTEM AND CIRCUIT INCLUDING MULTIPLE PHOTO DETECTORS AND AT LEAST ONE OPTICAL BARRIER

CROSS-REFERENCE TO RELATED APPLICATION(S)

This application is a non-provisional of and claims priority from U.S. Provisional Patent Application No. 61/323,798 filed on Apr. 13, 2010 and entitled "APPARATUS WITH OPTICAL FUNCTIONALITY AND ASSOCIATED METHODS," which is incorporated herein by reference in its entirety.

FIELD

The present disclosure is generally related to optical detector circuits, and more particularly to proximity and motion sensor circuits with multiple photo detectors.

BACKGROUND

Optical proximity and motion detector systems are used in a wide variety of applications, from robotic systems to security systems. The optical detectors in such systems detect large movements, which would not be suitable for use as an input interface to a computing system for receiving user input, for example. In some instances, such systems utilize a large number of optical sensors, which allows for pixel-level image processing to be used to detect motion of an object. Unfortunately, the large number of optical sensors increases the overall cost, and image processing consumes a large amount of power, making such systems unsuitable for use with computing systems, and particularly battery-powered or portable systems.

Conventionally, motion detectors can include single-mode detectors, active or passive, for motion detection. Active detectors can use multiple light-emitting diode (LED) sources to provide light to illuminate an object from at least three directions to triangulate a position of the object. Such systems can include reflectance-based proximity sensors and can use an associated algorithm configured to determine motion of the object by comparing changes in reflectance from the LED sources. Another conventional technique for active motion detection uses a discrete photo detector pair in connection with a focused reflected beam.

Passive motion detectors can be realized using a passive photo detector array configured to capture images and to detect motion through image processing. Unfortunately, image processing consumes too much power for use in portable computing systems. Another passive motion detector uses a pair of passive infrared detectors overlaid with a Fresnel lens, which gathers light and directs in onto the pair of passive infrared detectors. Unfortunately, such systems fail to provide sufficient resolution for use as an input device for a computing system.

SUMMARY

In an embodiment, a system includes a plurality of photo detectors, each of which generates a signal proportional to incident light. The system further includes an optical barrier and a control circuit. The optical barrier partially obstructs reflected light from reaching the plurality of photo detectors to produce a spatially dependent reflectance pattern that is dependent on a position of an object relative to a substrate. The control circuit determines a position of the object during a reflectance measurement cycle using each of the plurality of photo detectors by calibrating to ambient light conditions, measuring ambient plus reflected light, determining the reflected light and detecting the position of the object based on a ratio of the reflected light received by at least two of the plurality of photo detectors.

In another embodiment, a circuit includes a plurality of photo detectors configured to generate electrical signals based on received light including at least one of ambient light and reflected light. The circuit further includes an optical barrier configured to produce a non-uniform reflectance pattern over the plurality of photo detectors from light variations caused by an object proximate to a substrate. The circuit also includes a control circuit coupled to the plurality of photo detectors to receive the electrical signals, determine the light variations from the electrical signals, and determine a position of the object based on reflectance ratios of the light variations received by pairs of photo detectors of the plurality of photo detectors in response to determining the light variations.

In yet another embodiment, a system includes a substrate having an active surface and a light-emitting diode configured to emit light above the active surface. The system further includes a plurality of photo detectors disposed in the substrate adjacent to the active surface and an optical barrier adjacent to the active surface. The optical barrier produces a spatially dependent reflectance pattern over the plurality of photo detectors based on reflectance of light by an object. The system also includes a control circuit configured to control activation of the light-emitting diode and to sequentially sample incident light with the light-emitting diode deactivated and a reflectance with the light-emitting diode activated using each photo detector of the plurality of photo detectors. The control circuit determines proximity of an object relative to the substrate based on ratios of reflectances between adjacent photo detectors of the plurality of photo detectors.

DETAILED DESCRIPTION OF ILLUSTRATIVE EMBODIMENTS

Figure 1:
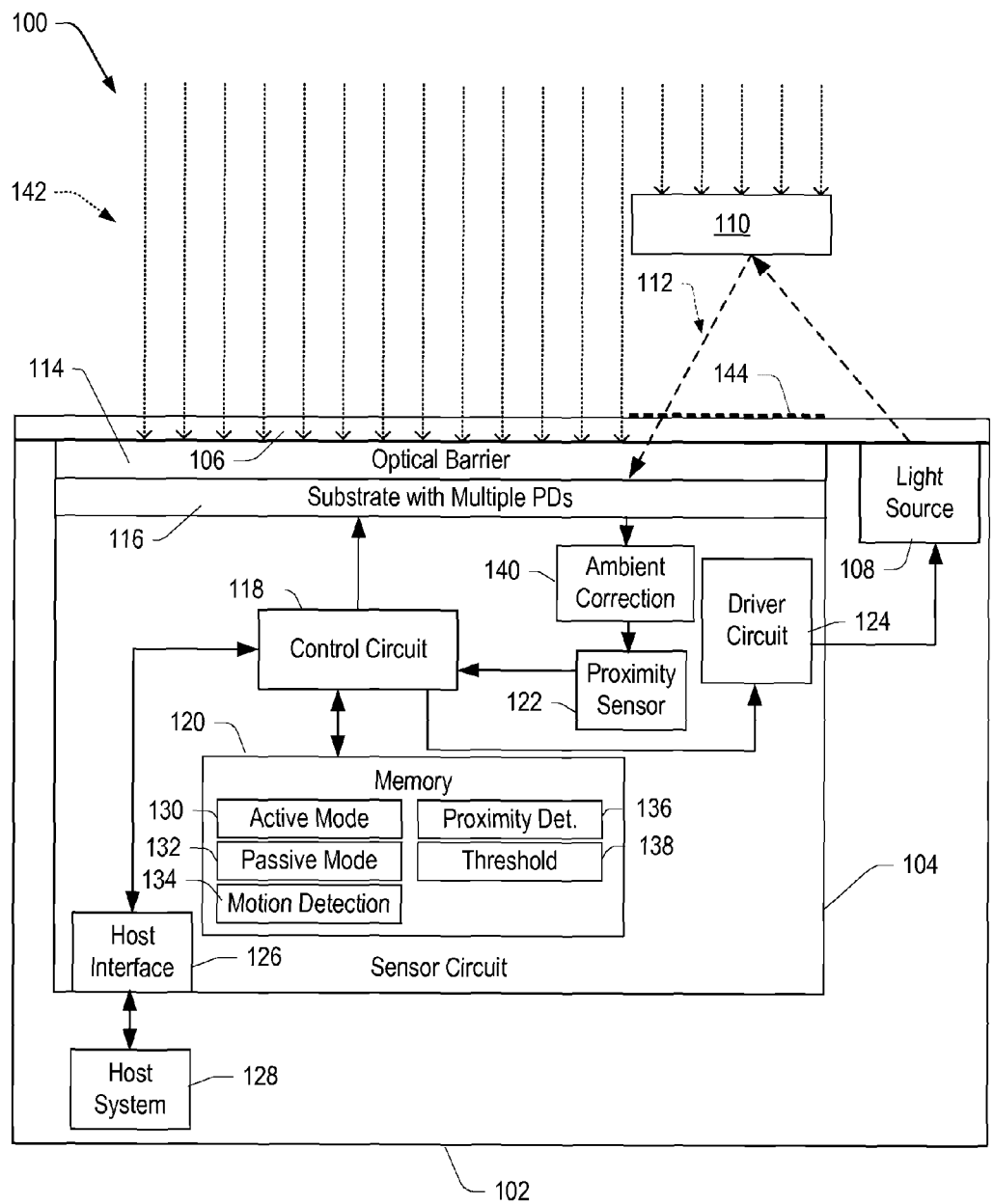
FIG. 1 is a block diagram of an embodiment of a system 100 including multiple photo detectors and an optical barrier.

In an example, a circuit includes a substrate with multiple photo detectors and includes an optical barrier including one or more elements. The optical barrier provides a non-uniform optical surface or an opaque barrier over the photo detectors to generate spatially-dependent reflectance pattern across the photo detectors. Reflected light (reactances) received by the photo detectors can be processed to detect motion and/or proximity of one or more objects relative to the substrate. The circuit is suitable for use in optical track pads (or other motion-tracking devices), bar code readers, motion detection systems, touch screen interfaces, optical gesture recognition systems, and other optical detection systems.

Reflectance sensors can detect an object moving into certain ranges because of a strong fourth-power decrease in reflected light from the object sensed. Because of this fourth-power effect, a twenty-percent change in distance causes approximately a hundred percent change in the reflected signal. For objects having varying degrees of reflectivity, a ten-to-one difference in reflectance translates to a fifty percent difference in detection range.

Processing circuitry can be configured to detect motion as a function of changes in measured reflectances over time. Gross gestures can be inferred from relative motion of the object. For example, motion in a positive X-direction can be interpreted as a right scroll gesture, and motion in a negative X-direction can be interpreted as a left scroll gesture. Motion in other directions can represent other gestures corresponding to other operations. Other types of gesture recognition, including more complicated gestures, such as pinching movements, tapping movements, and other types of gestures can be disambiguated to identify more complex inputs and corresponding functionality.

Embodiments of systems and methods described below utilize multiple measurements of the strength of reflected light signals and compare those measurements over time to detect relative motion of an object. However, direct measurements of the reflectance depend on the reflectance of the object surface as well as the orientation of the object surface. Thus, the reflectance measurement values may not provide a highly accurate, absolute measure of distance. Even a system that is calibrated to a particular object experiences changes in ambient light and object orientation (such as where the object has facets or other characteristics that impact the reflectance independent of the distance of the object from the detector) that can degrade the accuracy of a distance measurement based on measured reflectance.

However, relative motion can be reliably determined. While typical motion detection systems assume that variations in the reflectance of the object are due to motion and not to other factors (such as orientation), a system can measure reflectance iteratively over time to determine motion toward or away from the system. A system is described below that uses multiple receivers (photo diodes) to detect reflectances and to determine a reasonably accurate position and motion of an object. Such a system can be used for various complex applications including a touch-less interface for a portable computing device (such as a mobile telephone, a personal digital assistant, a portable music player, or another electronic device) or for optical control of a system.

FIG. 1 is a block diagram of an embodiment of a system 100 including multiple photo detectors and an optical barrier 114, which system is suitable for use in an optical proximity or motion detection system, such as a gesture recognition system. System 100 includes an optical detection device 102 including a sensor circuit 104 adapted to detect proximity and/or motion of an object 110 relative to a surface 106 based on reflected light 112. Sensor circuit 104 includes a substrate with multiple photo detectors 116, which receives reflected light 112 through the surface 106 (which is substantially transparent) and between the one or more objects or barrier elements arranged in a pattern to form optical barrier 114. Each of the objects or barrier elements of the optical pattern are formed from material that does not allow reflected light to pass through. Such barrier elements may be substantially opaque, reflective, light diffusive, or otherwise not image transparent. In an example, the substrate with multiple photo detectors 116 includes multiple photo detectors in a matrix arrangement with pre-determined spacing relative to each other.

Sensor circuit 104 includes a host interface 126 coupled to a host system 128 and a driver circuit 124 coupled to light source 108, such as a light-emitting diode (LED). In an example, LED is emitting in an infrared range of approximately 850 nanometers (nm) to around 950 nm, and the photo detectors within the substrate with multiple photo detectors 116 can be photodiodes with a sensitivity that peaks within this 850 to 950 nm range.

Sensor circuit 104 includes a control circuit 118 coupled to host interface 126 and driver circuit 124. Further, sensor circuit 104 includes a memory 120 and an analog-to-digital converter (ADC) 122 coupled to control circuit 118. Control circuit 118 includes an output coupled to the substrate with multiple photo detectors 116. Substrate with multiple photo detectors 116 includes a terminal coupled to an ambient correction circuit 140, which has an output coupled to ADC 122.

Control circuit 118 can be implemented as a programmable logic circuit, a processor, or other control circuit, depending on the specific implementation. In the illustrated example, control circuit 118 is a processor or other circuit configured to execute instructions stored in memory 120.

Host system 128 can be a processor or other circuitry associated with a device within which the sensor circuit 104 is incorporated. In an example, the host system 128 can be a processor within a computing device, such as a portable computer, a mobile telephone, a personal digital assistant, or another electronic device.

Memory 120 includes instructions executable by control circuit 118 to detect motion of the object 110 relative to the surface 106. The instructions include active mode detection instructions 130, passive mode detection instructions 132, and motion detection instructions 134. Further, memory 120 includes proximity detection instructions 136 and a threshold 138, suitable for use in connection with the motion detection instructions 134 to indicate when a relative change in reflectance is sufficiently large to indication motion of the object 110.

Threshold 138 can be set to reduce false motion detection due to interference from distortion due to photo detector noise, distortion due to analog-to-digital and other conversions within control circuit 118, or gain fluctuations due to flicker and light variation from sources such as the AC mains and ambient light flicker or sunlight flutter. As discussed in more detail below with respect to FIGS. 28-30, using ratios of reflectances and not the absolute reflectance changes provides immunity not only for ambient-induced changes but also for differences in an object's reflectivity.

In an active mode, control circuit 118 executes active mode detection instructions 130, which cause the control circuit 118 to send a signal to driver circuit 124 to turn off the light source 108 and to sample one of the plurality of photo detectors to obtain an ambient light measurement. Control circuit 118 then sends a signal to driver circuit 124 to turn on the light source 108 to illuminate an area proximate to the surface 106 and samples the same one of the plurality of photo detectors to obtain an ambient light plus reflected light measurement. Control circuit 118 iteratively selects a photo detector, measures the ambient light, and then measures the ambient light plus reflected light, turning off and on the light source 108 as appropriate, and then repeats the measurements with another photo detector to obtain a plurality of ambient light measurements and a plurality of ambient light plus reflected light measurements. Preferably, control circuit 118 measures the ambient light level at a point in time that is close to (either before or after) the ambient light plus reflected light measurement. In a particular embodiment, control circuit 118 measures both the ambient light and the ambient light plus reflected light each time a measurement is to be taken. Ambient light is represented by dotted lines generally indicated by reference numeral 142. In some instances, object 110 may cast a shadow (such as shadow 144) by blocking some of the ambient light 142. Control circuit 118 measures ambient light by keeping light source 108 turned off and receiving ambient light 142 at a plurality of photo detectors, which produce signals proportional to the received ambient light.

Control circuit 118 selectively provides the electrical signals (via a multiplexer (not shown)) to ADC 122, which converts the each signal into a digital signal, and provides the digital signal to control circuit 118. The control circuit 118 then subtracts the ambient light from the ambient light plus reflected light to determine a reflectance. In some embodiments, control circuit 118 may provide the raw digital data to a host system or another processor through an interface, and the host system or other processor may determine the reflectance. In this example, each photo detector is sampled for ambient light and for ambient light plus reflected light during a unique time slot.

In the above-described process, ambient light and ambient light plus reflected light measurements are taken sequentially using the same photo detector before the control circuit 118 takes similar measurements from a different photo detector. However, in an alternative example, the plurality of photo detectors is sampled substantially concurrently. For example, sample-hold circuits may be employed to capture the signal at a particular point in time for each of the plurality of photo detectors and to provide the captured data to control circuit 118 or to the host system. During this alternative embodiment, control circuit 118 controls driver circuit 124 to deactivate light source 108 for a first period of time (blanking interval or calibration interval) and then to activate light source 108 for a second period of time (sampling interval) before deactivating light source 108 again. During the blanking interval, control circuit 118 samples electrical signals from each of the photo detectors substantially concurrently. During the sampling intervals, control circuit 118 activates light source 108 and again measures a resulting current from each photo detector to evaluate a reflectance corresponding to each photo detector.

Optical barrier 114 interferes with the reflected light 112 to produce a non-uniform reflectance pattern on the surface of the substrate with multiple photo detectors 116, and the resulting reflectances at each of the photo detectors will be spatially dependent on the position of the object 110 relative to the surface 106. Each photo detector produces a signal proportional to the reflected light 112 that reaches the photo detector and provides the signal to ADC 122. Control circuit 118 executes proximity detection instructions 136, causing control circuit 118 to determine reflectance ratios based on the signal from ADC 122, which are attributable to adjacent photo detectors within the substrate with multiple photo detectors 116.

For example, if the substrate with multiple photo detectors 116 included first, second, and third photo detectors (PD1, PD2, and PD3), a ratio of a first reflectance from the first photo detector (PD1) and a second reflectance from the second photo detector PD2 is proportional to a position of the object 110 relative to the first and second photo detectors. Similarly, a ratio of a third reflectance of the third photo detector (PD3) and the first reflectance from the first photo detector (PD1) is proportional to a position of the object relative to the first and third photo detectors.

In some instances, control circuit 118 executes the motion detection instructions 134, which causes the control circuit 118 to determine a motion vector associated with the object by determining a difference between such reflectance ratios over time. The difference between the reflectances is compared to threshold 138, which can include a positive threshold and a negative threshold. If the difference is greater than the positive threshold, motion is detected in a first direction. If the difference is less than the negative threshold, motion is detected in a second direction. Thus, control circuit 118 determines the motion of the object 110 as a change in reflectance ratios over time. By evaluating ratios, control circuit 118 avoids problems of erroneous detection of motion due to differences in object reflectivity or due to non-ideal gain modulation of ADC 122 from large ambient changes.

In a passive mode, control circuit 118 executes passive mode detection instructions 132, which cause the control circuit 118 to selectively activate one or more of the photo detectors within the substrate with multiple photo detectors 116 to detect ambient light 142 including light variations due to hulk ambient changes; such as, from room illumination changes and from changing shadows (such as shadow 144) cast by the object 110 and also due to changes in the reflected light from the object, and to produce signals proportional to the received light. Unlike active reflectance proximity sensing which can positively detect objects in or out of range without motion, passive mode can generally only detect proximity to moving objects. In an environment illuminated by uniform light sources, changes in light falling on a photo sensor are always due to changes in position (motion) of proximate objects. However, ambient illumination may change by comparable amounts due to various reasons; such as, variations in lighting power line voltage, clouds moving, etc. By using multiple photodiodes with different views due to shadowing, aperture directionality and/or lensing, in conjunction with signal processing, it is possible to differentiate light variations due to a proximate object motion versus bulk ambient changes. In general, an object's motion will cause less overall combined variation in intensity than relative variation between photodiodes. This effect can be increased by optimizing the view, shadowing or lensing of the photodiodes. For example, one photodiode can have an upward view of the ceiling of a room where a moving object wilt not be seen or directly shadow the illumination falling on it, while a second photodiode will have a horizontal view of the room through multiple shadow slits (picket fencing). By setting a ratioed change threshold between the outputs of both of the diodes of for example, over 1%, motion detection of a moving object within a certain range of the two photodiodes can be reliably detected as the moving object passes in front of an open view and then behind a shadowing block, which causes a change in photodiode illumination. Bulk ambient changes in room illumination will tend to cause the same changes in both photodiode outputs, but not cause a change in ratios between the two diodes.

Light variation due to motion can be increased, therefore increasing motion sensitivity, by adding shadowing from single or multiple shadowing structures and also multi-focus lensing. Similarly, two photodiodes can have different horizontal views instead of one with a ceiling view and still detect horizontal motion. The ratioed outputs of the two photodiodes will change due to the horizontal motion; however, the ratioed outputs will be much less with bulk illumination changes, which will be substantially equal for both photodiodes. Generally, passive motion detection is sensitive to an object's view angle and not its absolute size. Consequently, a small object close moving at a slower speed will produce a similar change in ratioed photodiode outputs as a larger object, at an proportionally further distance, traveling at a proportionally faster speed. However, in practice if the application is proximity detecting motion of standard sized objects; such as human beings (which are fairly uniform in size), then an approximate proximity range can be determined as a function of the magnitude of the changes.

The resulting signals are provided to ADC 122, which produces digital signals which change as function of the bulk ambient and the proximity of a moving object 110 and provides such signals to control circuit 118. Control circuit 118 determines the relative position and motion of the object 110, using proximity detection instructions 136, motion detection instructions 134, and threshold 138 as discussed above, based on shadows cast by object 110 and partially obstructed by optical barrier 114, producing spatially-dependent light patterns over the photo detectors.

Optical barrier 114 is provided over or above the active surface of substrate with multiple photo detectors 116. Optical barrier provides a non-uniform surface over the photo detectors. Optical barrier 114 can be printed on the surface (ink) of the chip or of the package, can be molded into the package (lens, notches, holes), can be part of the heterogeneous package material (grain fill, voids) or can be directly deposited on the surface of the substrate with multiple photo detectors 116 (using, for example, a thick film or Micro-electro-mechanical systems (MEMS) technology). In some instances, optical barrier 114 includes structures that extend substantially perpendicular to surface 106.

Further, optical barrier 114 includes one or more barrier elements that can be arranged in a variety of patterns, such as a rectangular pattern, cross-shaped pattern, a crisscross or crossword pattern, a striped pattern, a pattern including an array of dots, an array of rectangles or squares, or any combination thereof, a concentric ring pattern, a spiral pattern, an acentric pattern, a concentric arc pattern, another pattern, or any combination thereof. Optical barrier 114 is designed to interfere with light to produce a non-uniform light pattern over the photo detectors to define optical detection regions. Alternatively, optical barrier 114 can be provided by a lens placed over each photo detector to define spatially-dependent optical detection regions. As used herein, a spatially-dependent optical detection region is a three-dimensional area within which a particular photo detector is configured to receive reflected light.

In an alternative embodiment, multiple light sources, such as multiple narrow-beam light-emitting diodes (LEDs), can be used, and control circuit 118 is adapted to combine the reflectance signals from the photo detectors. In an example, control circuit 118 sequentially drives the multiple narrow-beam LEDs, which are arranged to direct light in different directions to create a non-overlapping radiation pattern. In this instance, control circuit 118 synchronously or sequentially samples the photo detectors with each LED drive signal and evaluates motion based on time and reflectance ratio differences.

In system 100, photo detectors are configured to receive infrared light, which may be reflected from object 110 based on infrared light emitted by light source 108. However, sunlight and various incandescent lights, including halogen and any black body radiator, may produce infrared frequency components that can introduce noise. While long integration periods can reduce flicker noise in proportion to the number of cycles, such long periods increase response time for hand-control applications, and cause the circuitry to consume more power due the relatively long periods during which the light source 108 is emitting light.

In system 100, control circuit 118 may be configured to have a relatively short measurement period, such as less than about 52 microseconds per measurement cycle. Control circuit 118 controls the measurement period by controlling the driver circuitry, which applies drive signals to the photo detectors. In a particular example, a fifteen bit signal-to-noise ratio can be achieved with a single pulse of light source 108, which pulse has a duration of approximately 25.6 microseconds. This reduces power consumption and response time while enhancing immunity from both incandescent flicker noise and sunlight flutter noise. Thus, multiple photo detector measurements can be taken in less than a few hundred microseconds.

Further, substrate with multiple photo detectors 116 may be formed using any of a variety of semiconductor fabrication processes, including, diffusion techniques, etching, photolithography, epitaxial growth, or other processes. In some embodiments, one may use different types, configurations, and manufacturing or fabrication techniques, as desired.

The above-described system 100 depicted the substrate with photo detectors 116 and the optical barrier 114 in block form. An example of one possible implementation of the substrate with photo detectors 116 and an optical barrier 114 having a cross-shaped pattern is described below with respect to FIG. 2.

Figure 2:
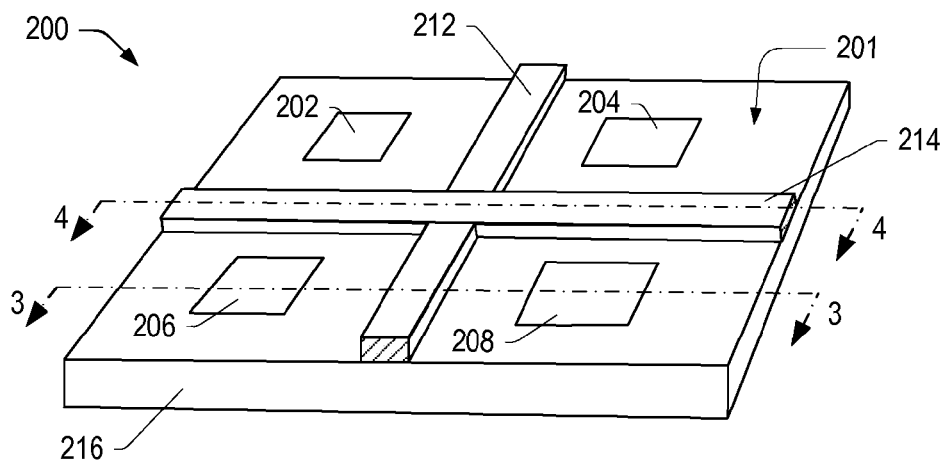
FIG. 2 is a perspective view of a portion of a circuit including multiple photo detectors suitable for use in the system of FIG. 1.

FIG. 2 is a perspective view of a portion of a circuit 200 including a substrate 216 with multiple photo detectors 202, 204, 206, and 208 suitable for use as a portion of the substrate with multiple photo detectors 116 in the system of FIG. 1. Substrate 216 includes an active surface 201, which is proximate to a transparent surface, such as surface 106 in FIG. 1. Further, substrate 216 includes photo detectors 202, 204, 206, and 208 formed proximate to the active surface 201. As used herein, the term "active surface" refers to a surface of the substrate that is exposed to light, through transparent material, for the purpose of detection of light using photo detectors, such as photo detectors 202, 204, 206, and 208. In some instances, a substrate has more than one active surface.

In the illustrated example, optical barrier 114 includes barrier elements 212 and 214, which are positioned above and between the multiple photo detectors 116 in a cross-shaped configuration. In particular, barrier element 212 is arranged substantially perpendicular to barrier element 214 in an X-Y plane parallel to the active surface 201 of the substrate 216. The positions and vertical heights of the barrier elements 212 and 214 relative to the photo detectors 202, 204, 206, and 208 cooperate to define spatially-dependent optical detection regions.

Figure 7:
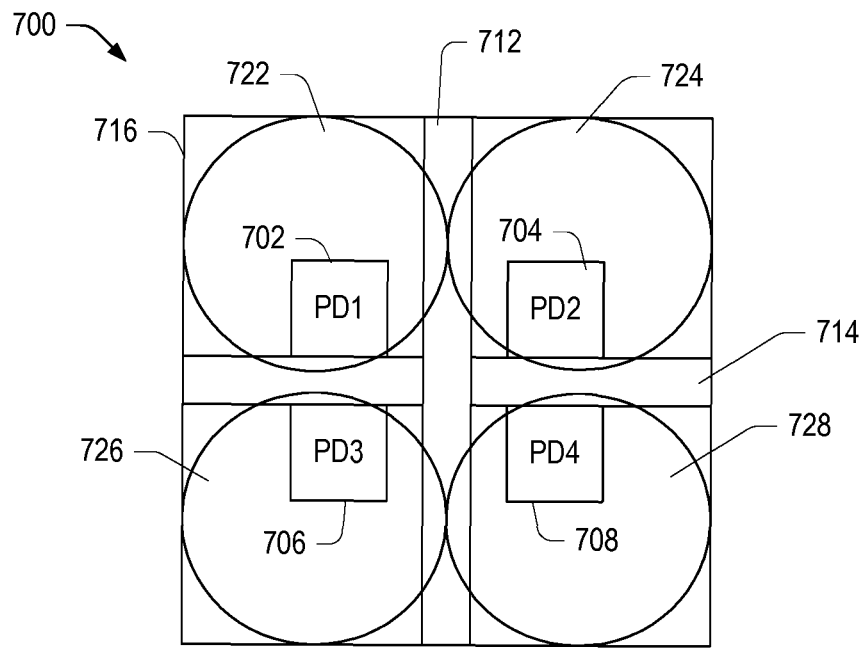
FIG. 7 is a top view of a portion of a circuit with multiple photo detectors and an optical barrier configured to define spatially-dependent optical detection regions, which circuit is suitable for use in the system of FIG. 1.
Figure 8:
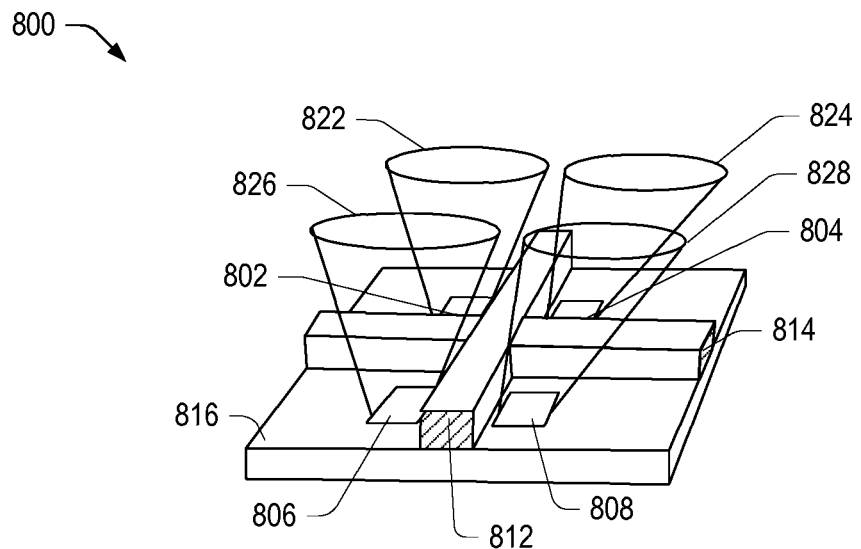
FIG. 8 is a perspective view of a portion of a circuit with multiple photo detectors and an optical barrier suitable for use in the system of FIG. 1, including a perspective view of the spatially-dependent optical detection regions.

For example, if the photo detectors 202, 204, 206, and 208 were positioned closer to barrier element 114 (as illustrated by photo detectors 702, 704, 706, 708, 806 and 808 and barrier elements 712, 714, 812, and 814 in FIGS. 7 and 8, respectively), the barrier elements 212 and 214 would restrict or control the size or area of the optical detection regions. Further, if the heights of the barrier elements 212 and 214 are changed, the optical detection regions of photo detectors 202, 204, 206, and 208 would change accordingly. In the illustrated example, photo detectors 202, 204, 206, and 208 are below or within a substantially transparent layer, such that the barrier elements 212 and 214 have a height dimension relative to the photo detectors 202, 204, 206, and 208 to partially limit their optical detection regions.

Barrier elements 212 and 214 cooperate to interfere with ambient light and reflected light (or shadows in passive mode) to produce a spatially-dependent, non-uniform reflectance pattern, which at least partially depends on the position of the object causing the reflection (or the shadow). Photo detectors 202, 204, 206, and 208 detect reflectances associated with the irregular reflectance pattern and produce electrical signals proportional to the reactances. Ambient light plus reflectance measurements are converted to a digital signal by ADC 122. Control circuit 118 provides ambient light correction to the measurements and uses ratios of reactances between adjacent photo detectors, such as photo detectors 202 and 204 or photo detectors 202 and 206, to determine the proximity of an object to the surface of substrate 216. Further, the control circuit 118 can compare differences between the ratios over time to one or more thresholds to determine a direction of motion of an object. If the difference does not exceed one of the thresholds, control circuit 118 determines that the object has not moved during the period of time.

In the illustrated example, the circuit 200 is depicted in a perspective view in which some implementation details are not visible. An example of a cross-sectional view showing additional details of the circuit 200 of FIG. 2 are described below with respect to FIG. 3.

Figure 3:
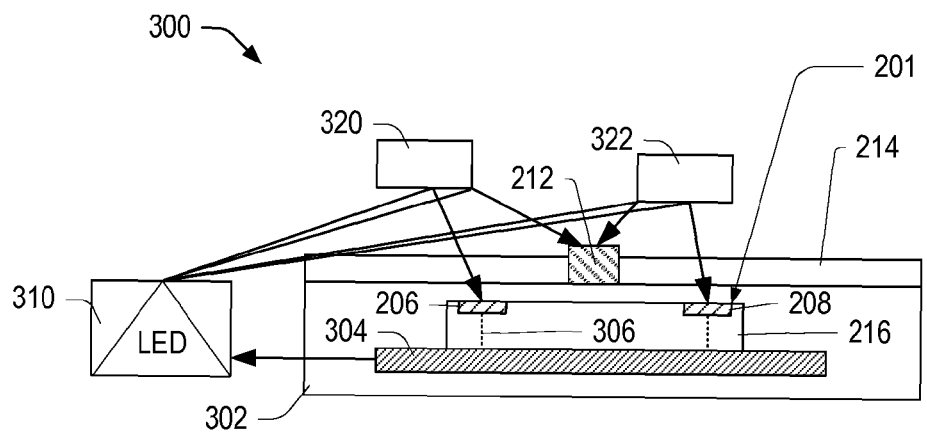
FIG. 3 is a partial block diagram and partial cross-sectional diagram of a portion of a system including a cross-sectional view of the circuit of FIG. 2, taken along line 3-3 in FIG. 2.

FIG. 3 is a diagram of a system 300 including a partial block diagram and partial cross-sectional diagram of the circuit 200 depicted in FIG. 2, taken along line 3-3 in FIG. 2. In particular, the substrate 216, and barrier element 212 are depicted in cross-section. Photo detectors 206 and 208 are generally indicated as simplified, cross-hatched blocks, indicating their general location. The details of the particular implementation of the photo detectors 206 and 208 are omitted for the ease of discussion. Photo detectors 206 and 208 can be implemented using any number of photo-sensitive circuit elements, such photodiodes or other circuit components, which are known. The specific type and the implementation of the photo detectors 206 and 208, and of the other photo detectors 202 and 204, are left to the circuit designer.

System 300 includes a transparent package 302 over the active surface 201 of substrate 216, which is mounted to another circuit 304. Wire traces or vias 306 connect photo detectors 206 and 208 to circuit 304. In an example, circuit 304 represents sensor circuit 104 depicted in FIG. 1.

Barrier elements 212 and 214 are positioned on the surface of the transparent package 302. System 300 further includes a light-emitting diode 310 controlled by circuit 304 to emit light above the transparent package 302, which light is reflected by objects 320 and 322. Barrier element 212 prevents a portion of the reflected light from reaching the surface of the transparent package 302 and thereby prevents the reflected light from reaching photo detectors 206 and 208, creating a non-uniform (irregular) reflectance pattern across photo detectors 206 and 208.

In general, reflectances from object 322 toward photo detector 208 will be stronger than the reflectances from object 322 that reach photo detector 206. The distance of the object relative to the photo detector determines the relative strength of the reflectance signal. The optical barrier 114, in particular barrier elements 214 and 212, block some of the reflectances, increasing the spatial-dependence of the measured reflectances.

Figure 4:
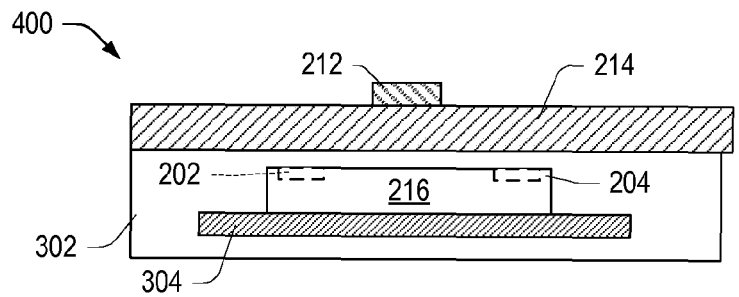
FIG. 4 is a cross-sectional diagram of a portion of a system including a cross-sectional view of the portion of the circuit of FIG. 2, taken along line 4-4 in FIG. 2.

FIG. 4 is a cross-sectional view 400 of the portion of the circuit 200 of FIG. 2, taken along line 4-4 in FIG. 2. In the illustrated example, photo detectors 202 and 204 are depicted in phantom because photo detectors 202 and 204 would not be visible through the substrate 216 at the cross-sectional location. In the illustrated example, barrier elements 212 and 214 have different vertical dimensions relative to the surface of the transparent package 402 and relative to the photo detectors 202 and 204. Thus, barrier elements 212 and 214 define a non-uniform pattern, providing spatially-dependent optical detection regions.

While the cross-sectional views described above with respect to FIGS. 3 and 4 included barrier elements 212 and 214 positioned on the surface of the transparent package 302, the barrier elements may be provided in a variety of locations relative to the transparent package and relative to the photo detectors. An example of one possible implementation of a circuit with the optical barrier provided within the transparent package is described below with respect to FIG. 5.

Figure 5:
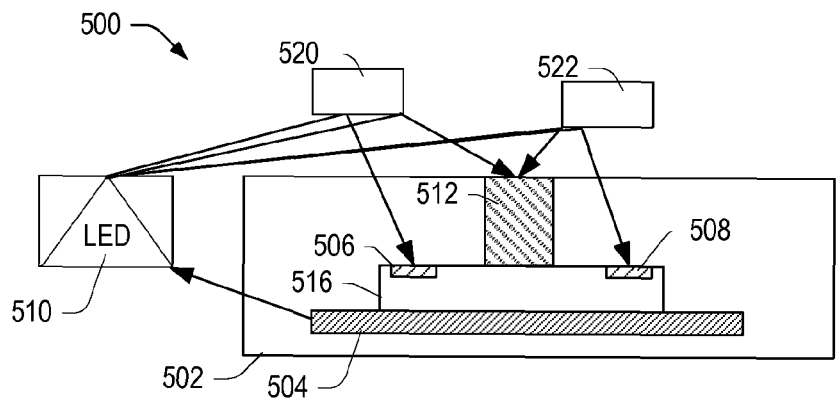
FIG. 5 is a partial block diagram and partial cross-sectional diagram of an embodiment of a portion of a system adapted to detect proximity and/or motion of one or more objects based on reflected light, which system suitable for use in the system of FIG. 1.

FIG. 5 is a partial block diagram and partial cross-sectional diagram of a portion of a system 500 adapted to detect motion of one or more objects based on reflected light, which is system 500 suitable for use in the system 100 of FIG. 1. System 500 includes a substrate 516 with multiple photo detectors 506 and 508. System 500 further includes a circuit 504 coupled to substrate 516 and an optical barrier 512 above the substrate 516. A transparent package 502 coats circuit 504, substrate 516, and optical barrier 512.

System 500 further includes a light-emitting diode 510 controlled by circuit 504 to emit light above a surface of the transparent package 502 to illuminate objects 520 and 522, which reflect some of the light toward substrate 516. Optical barrier 512 blocks some of the reflected light, defining spatially-dependent optical detection regions. Each optical detection region is associated with one of the photo detectors 506 and 508.

Circuit 504 represents circuit 104 in FIG. 1, and can be configured to detect multiple objects 520 and 522 above the surface of substrate 516. This particular example depicts two objects 520 and 522, but multiple objects and their respective proximities and/or movements may be detected. Thus, circuit 504 is suitable for use in a system configured to detect proximity and movement of multiple objects, such as a gesture recognition system.

In the illustrated example, transparent package 502 includes the optical barrier 512. In FIGS. 3 and 4, the barrier elements 212 and 214 are positioned on a surface of the transparent package 302. In the illustrated example of FIG. 5, the transparent package 502 surrounds the optical barrier 512. An example of another possible implementation of a circuit with the barrier elements is described below with respect to FIG. 6.

Figure 6:
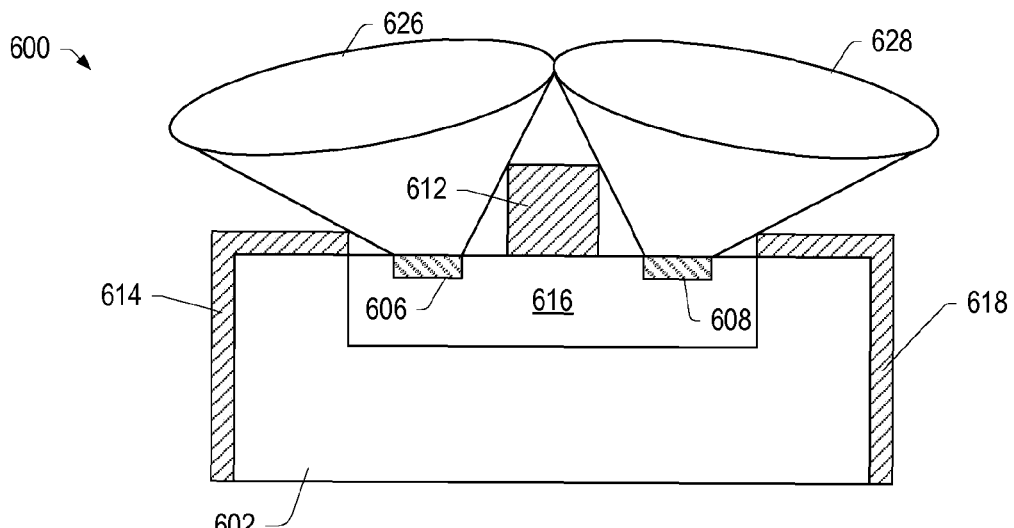
FIG. 6 is a cross-sectional view of a portion of a circuit with multiple photo detectors and an optical barrier configured to define spatially-dependent optical detection regions, which circuit is suitable for use in the system of FIG. 1.

FIG. 6 is a cross-sectional view of a portion of a circuit 600 including a substrate 616 with multiple photo detectors 606 and 608 and barrier elements 612, 614, and 618 configured to define spatially-dependent optical detection regions 626 and 628, which circuit 600 is suitable for use in the system 100 of FIG. 1. Circuit 600 includes a package window 602 including substrate 616. Circuit 600 further includes an opaque layer or coating, which provides barrier elements 614 and 618, and defines an opening over at least a portion of substrate 616. Barrier element 612 extends substantially perpendicular to a surface of the substrate 616 within the opening, producing spatially-dependent optical detection regions 626 and 628. Spatially-dependent optical detection regions 626 and 628 are conical shaped areas within which light reflected by an object is not blocked by barrier element 612, allowing the reflected light to reach the associated photo detector 606 or 608. Barrier element 612 limits the overlap of the spatially-dependent optical detection regions 626 and 628.

As shown, the vertical extent of barrier element 612 determines the range of the right-portion of spatially-dependent optical detection region 626 and the left portion of the optical detection region 628. Further, barrier element 614 limits a left-portion of spatially-dependent optical detection region 626, and barrier element 618 limits a right portion of optical detection region 628. Thus, the vertical dimension (i.e., height) and the horizontal position relative to the photo detectors 606 and 608 cooperate to define the optical detection regions 626 and 628.

The spacing between the photo detectors 606 and 608 and barrier element 612 can be designed to define the optical detection regions. An example of a substrate including an optical barrier and photo detectors adjacent to at least one of the barrier elements of the optical barrier is described below with respect to FIG. 7.

FIG. 7 is a top view of a portion of a circuit 700 with multiple photo detectors 702, 704, 706 and 708 and an optical barrier including barrier elements 712 and 714 configured to define spatially-dependent optical detection regions 722, 724, 726, and 728, which circuit 700 is suitable for use in the system 100 of FIG. 1. As shown, photo detectors 702, 704, 706, and 708 are in contact with barrier element 714 and are separated by a distance from barrier element 712. Spatially-dependent optical detection region 722 is separate from spatially-dependent optical detection region 726 within a distance range from active surface 201 given by a height of the optical barrier (barrier elements 712 and 714), a layout of photo detectors 702, 704, 706 and 708 relative to each other and a spacing of photo detectors 702, 704, 706, and 708 relative to the barrier elements 712 and 714. Further, spatially-dependent optical detection region 722 abuts spatially-dependent optical detection region 724. In this example, at least to a certain height above the photo detectors 702, 704, 706, and 708, spatially-dependent optical detection regions 722, 724, 726, and 728 are non-overlapping.

Depending on the height of the barrier elements 712 and 714, the spatially-dependent optical detection regions 722, 724, 726, and 728 may overlap at certain distance from the photodetector or abut or may be non-overlapping. An example of a circuit defining distinct, non-overlapping optical detection regions is described below in FIG. 8.

FIG. 8 is a perspective view of a portion of a circuit 800 with multiple photo detectors 802, 804, 806, and 808 and an optical barrier including barrier elements 812 and 814, suitable for use in the system 100 of FIG. 1, including a perspective view of the optical detection regions. In this example, photo detectors 802, 804, 806, and 808 are closer to barrier element 812 than to barrier element 814. The relative spacing of photo detectors 802, 804, 806, and 808 and barrier elements 812 and 814, together with the vertical dimensions of barrier elements 812 and 814, cooperate to define unique, non-overlapping, spatially-dependent optical detection regions 822, 824, 826, and 828, which are substantially conically shaped regions.

In the examples described above with respect to FIGS. 1-8, a proximity sensor can be integrated with the substrate with multiple photo detectors. The multiple photo detectors are arranged in a matrix with defined relative spacing to each other, and optical barrier defines optical detection regions. The optical barrier can be provided by a non-uniform surface, by barrier elements, or by opaque layers positioned or formed over the photodiode matrix. The optical barrier can be deposited either directly onto the chip surface and incorporated within the chip package or externally onto the package. The optical barrier can be printed on the surface (opaque ink), molded into the package (such as lenses, notches, or holes), formed as part of the heterogeneous package material (such as grain fill, voids, or opaque layers) or be directly deposited on the silicon surface (thick film or MEMS technology). Optical barrier can be shaped into a variety of shapes and patterns. Some examples of such patterns are described below with respect to FIGS. 9-18.

Figure 9:
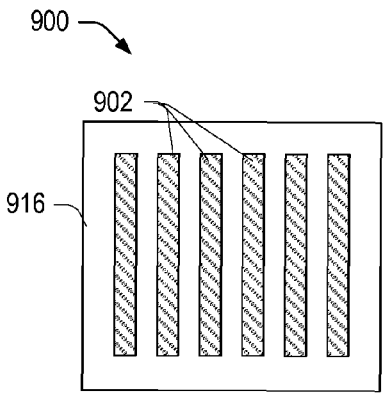
FIGS. 9-18 are top views of substrates including examples of optical barriers arranged in different patterns.

FIGS. 9-18 are top views of substrate including examples of optical barriers arranged in different patterns. In FIG. 9, a portion of a circuit 900 includes a substrate 916 and an optical barrier having a plurality of barrier elements 902 arranged a pattern of substantially parallel lines. Photo detectors (not shown) can be positioned in the spaces between the barrier elements 902.

Figure 10:
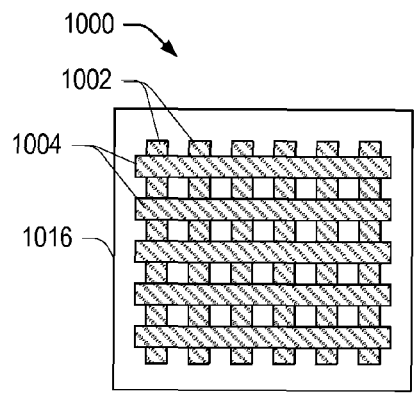

FIG. 10 depicts a portion of a circuit 1000 including a substrate 1016 with an optical barrier including a plurality of barrier elements 1002 and 1004 arranged in a crisscross pattern. Barrier elements 1002 extend substantially parallel to one another substantially perpendicular to barrier elements 1004. The crisscross pattern defines a plurality of spatially-dependent optical detection regions. Further, the widths of barrier elements 1002 and 1004 may be adjusted to alter the spatially-dependent optical detection regions.

Adjusting the relative widths of barrier elements 1002 and 1004 adjusts the opening through which light is allowed to reach the active surface of the substrate with multiple photo detectors, altering the horizontal extent of the spatially-dependent optical detection regions. By narrowing the opening (widening the barrier elements 1002 and 1004), the distance at which motion can be reliably detected can be increased. Further, by adjusting the height of the optical barrier and by adjusting the position of the photo detector relative to the optical barrier, the extent of the spatially-dependent optical detection regions can be adjusted.

Figure 11:
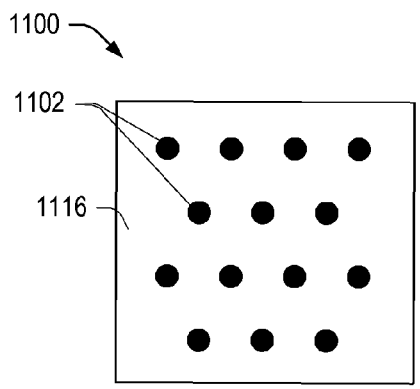

FIG. 11 depicts a portion of a circuit 1100 including a substrate 1116 with an optical barrier including a plurality of barrier elements 1102 arranged in a checkerboard-type of pattern. In the illustrated example, the barrier elements 1102 are substantially circular. Barrier elements 1102 may be implemented as painted dots, as solder bumps, or as other types of globular depositions, providing patterned optical obstructions.

Figure 12:
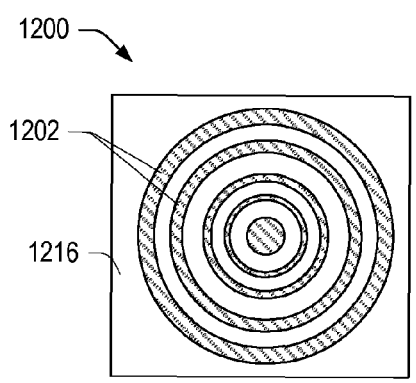

FIG. 12 depicts a portion of a circuit 1200 including a substrate 1216 with an optical barrier including a plurality of barrier elements 1202 arranged as concentric rings with spaces between the rings. In this instance, photo detectors may be positioned in the spaces between the concentric rings and at spatial intervals sufficient to provide optical isolation between the photo detectors. In another instance, such photo detectors are arranged differently in one space between adjacent ring-shaped barrier elements 1202 as compared to another space between other adjacent ring-shaped barrier elements.

Figure 13:
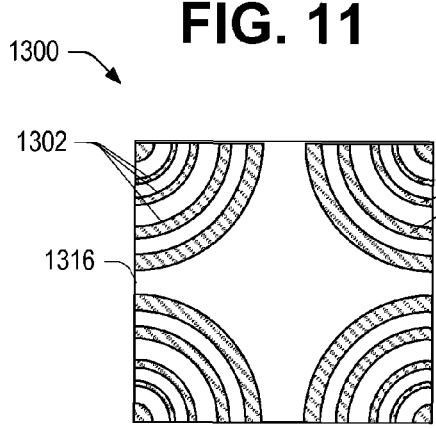

FIG. 13 depicts a portion of a circuit 1300 including a substrate 1316 with an optical barrier including a plurality of barrier elements, such as barrier elements 1302 and barrier elements 1304. In this instance, barrier elements 1302 are substantially concentric ring portions, which are not concentric with respect to barrier elements 1304. Photo detectors may be arranged within the spaces between the barrier elements 1302 and between barrier elements 1304.

Figure 14:
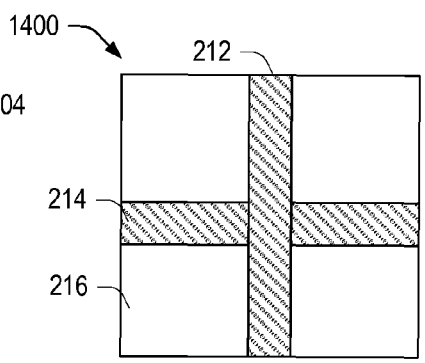

FIG. 14 depicts a portion of a circuit 1400 including substrate 216 with an optical barrier including barrier elements 212 and 214 arranged in a cross-shaped configuration. As previously discussed with respect to FIG. 2, the cross-shaped configuration defines non-uniform light patterns that can be used to detect proximity and motion of an object relative to the substrate 216.

Figure 15:
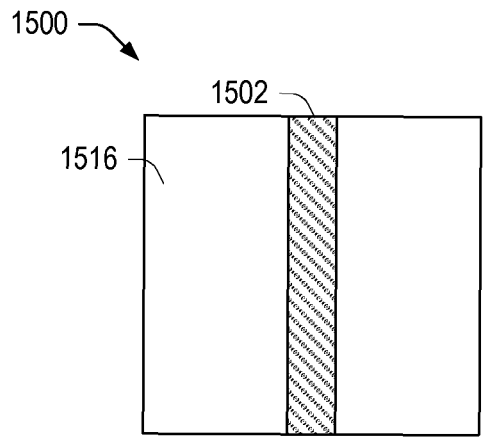

FIG. 15 depicts a portion of a circuit 1500 including a substrate 1516 with a barrier element 1502 that divides the substrate 1516 into two halves. In this example, barrier element 1502 defines two spatially-dependent optical detection regions.

Figure 16:
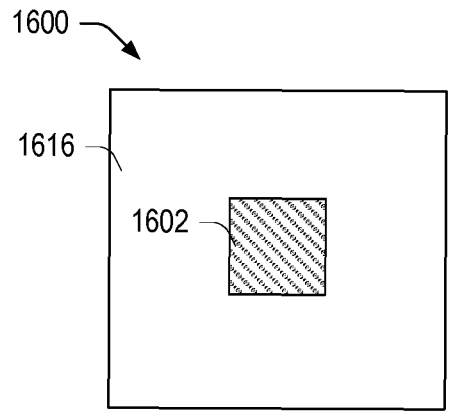

FIG. 16 depicts a portion of a circuit 1600 including a substrate 1616 with an optical barrier including barrier element 1602. Barrier element 1602 is a square-shape that is substantially centered within the boundaries of substrate 1616. Photo detectors may be positioned near the sides of barrier element 1602 to define optical detection regions corresponding to the sides of the barrier element 1602. This particular configuration of the barrier element 1602 is useful for quad-detectors if made using micro-electro-mechanical systems (MEMS) technology.

Figure 17:
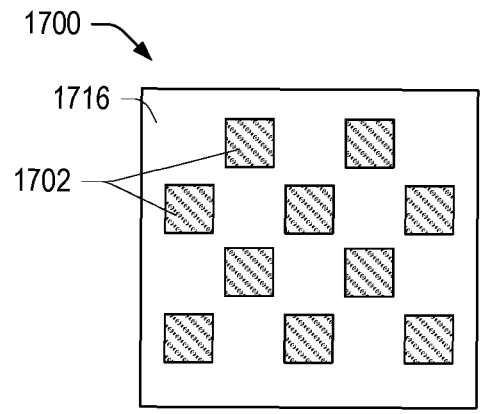

FIG. 17 depicts a portion of a circuit 1700 including a substrate 1716 with an optical barrier including barrier elements 1702 arranged in a checkerboard configuration. Photo detectors may be positioned in spaces between the barrier elements 1702.

Figure 18:
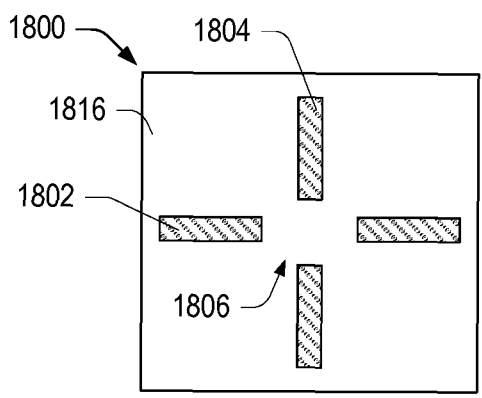

FIG. 18 depicts a portion of a circuit 1800 including a substrate 1816 with an optical barrier including barrier elements 1802 and 1804 arranged in substantially a cross-shaped configuration with a gap 1806 where the barrier elements 1802 and 1804 would otherwise intersect. This configuration divides the substrate into four quadrants with gap 1806 in the center. Any or all of the quadrants or the gap 1806 can include a photo detector. As with the barrier element 1602 configuration of FIG. 16, this particular configuration of the barrier element 1802 is useful for quad-detectors if made using micro-electro-mechanical systems (MEMS) technology.

In addition to depositing or placing the barrier elements between photo detectors (or vice versa), it is also possible to use the barrier elements to divide each pair of photo detectors into smaller units, where each photo detector has a dedicated light barrier. Reducing the optical slit or opening through which the photo detector receives light can be useful to limit the optical detection region. Additionally, it can be useful when directionality is desired at a greater distance from the photo detectors or where the barrier elements cannot be produced with sufficient height for the distance.

While the patterns described above with respect to FIGS. 9-18 can be used to define optical detection regions and irregular light patterns, other patterns may also be used. For example, the concentric ring pattern could be replaced with a spiral pattern. Further, patterns may be combined or partially combined to produce barrier element 114. Additionally, barrier element 114 may include other shapes or shape combinations, such as stars, triangles, octagons, and other shapes, either to produce patterns depicted in FIGS. 9-18 or to form new patterns. For example, an octagon shape could be used to replace barrier element 1602 in FIG. 16, and photo detectors could be formed adjacent to each side of the octagon, providing spatially-dependent optical detection regions.

Figure 19:
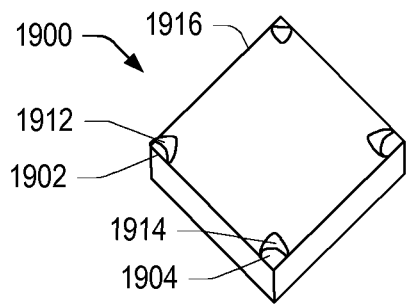
FIG. 19 is a perspective view of an embodiment of a portion of a circuit including multiple photo detectors with lenses for creating spatially-dependent optical detection regions, which circuit is suitable for use in the system of FIG. 1.

FIG. 19 is a perspective view of an embodiment of a portion of a circuit 1900 including a substrate 1916 having multiple photo detectors 1902 and 1904 with lenses 1912 and 1914, respectively, for creating optical detection regions. Circuit 1900 is suitable for use with system 100 in FIG. 1. In this instance, lenses 1912 and 1914 are configured to limit the optical detection region of an associated photo detector 1902 or 1904, respectively, to provide spatially-dependent optical detection regions. In an alternative embodiment, a single, large Fresnell lens is positioned above circuit 1900 and covering all of the detectors. The Fresnell lens creates a non-uniform pattern, which establishes spatially-dependent optical detection regions.

Figure 20:
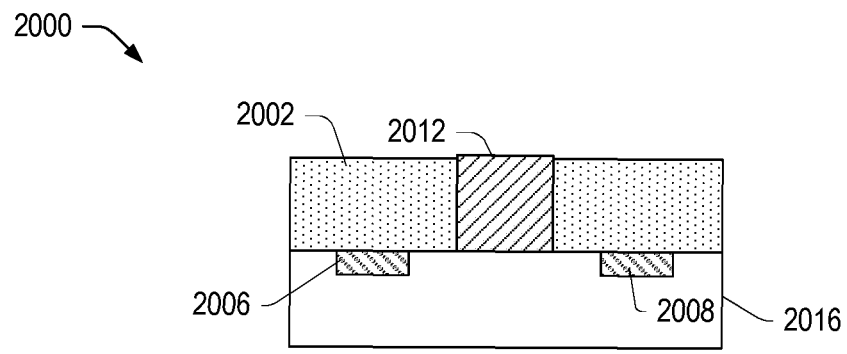
FIG. 20 is a cross-sectional view of a portion of the circuit of FIG. 2 including a transparent layer.

FIG. 20 is a cross-sectional view of a portion of a circuit 2000 including a transparent layer 2002. Circuit 2000 includes a substrate 2016 with photo detectors 2006 and 2008 separated by a pre-determined distance and a barrier element 2012 disposed there between. Barrier element 2012 extends above the surface of the transparent layer. In this instance, barrier element 2012 may be a wire trace, a via, or other electrically conductive feature configurable to couple to another circuit.

White FIG. 20 depicts circuit 2000 in cross-section and discoupled from associated circuitry, circuit 2000 can be used in conjunction with system 100 depicted in FIG. 1. An example of a system including circuit 2000 is described below with respect to FIG. 21.

Figure 21:
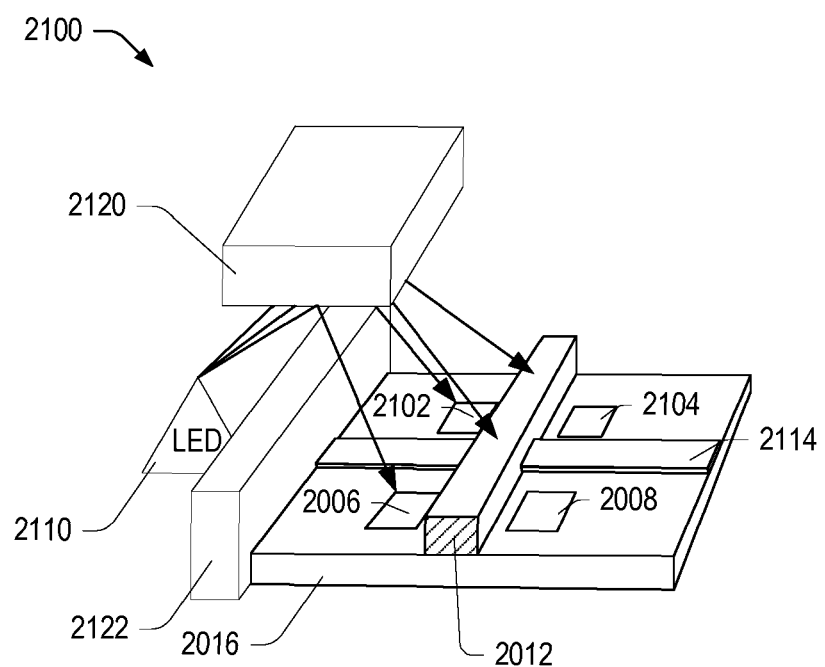
FIG. 21 is a perspective view of a system including a light source for illuminating an object and a portion of a circuit including multiple photo detectors and an optical barrier defining spatially-dependent optical detection regions, which system is suitable for use in the system of FIG. 1.

FIG. 21 is a perspective view of a system 2100 including a light-emitting diode 2110 for illuminating an object 2120 and including circuit 2000. Substrate 2016 includes barrier elements 2012 and 2114 and photo detectors 2102, 2104, 2006, and 2008. An additional barrier element 2122 is positioned between light-emitting diode 2110 and substrate 2016.

In the illustrated example, light-emitting diode 2110 illuminates object 2120, and object 2120 reflects some of the light toward substrate 2016. Some of the reflected light reaches photo detectors 2102 and 2006 and barrier element 2012 prevents at least some of the reflected light from reaching photo detectors 2104 and 2008. As the object 2120 moves further to the left, less of the reflected light will reach the photo detectors 2102, 2104, 2006, and 2008. Similarly, as the object 2120 moves further to the right, the amount of reflected light changes. An example of the change in reflectances is described below with respect to FIGS. 22-24, which are partial block diagrams and partial cross-sectional diagrams of a system including a light source, a first barrier element, and a portion of a circuit with multiple photo detectors and a second barrier element illustrating different reflected light patterns based on a position of an object relative to the circuit.

Figure 22:
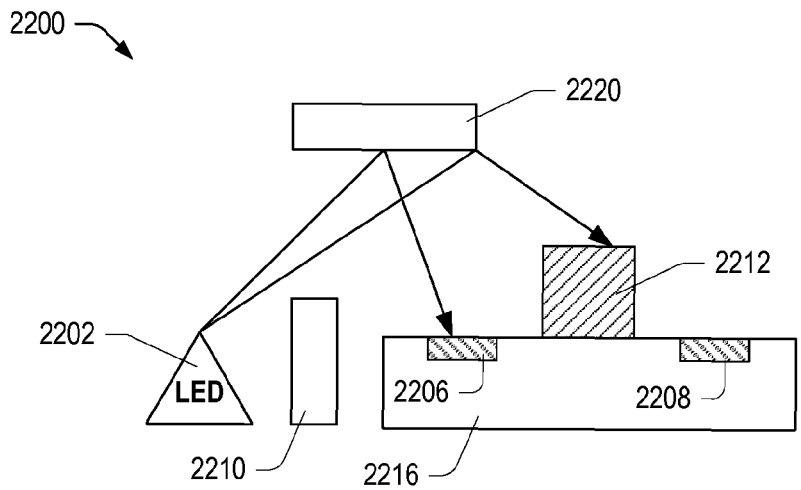
FIGS. 22-24 are partial block diagram and partial cross-sectional diagram views of a system including a light source, a first optical barrier, and a portion of a circuit with multiple photo detectors and a second optical barrier illustrating different reflected light patterns based on a position of an object relative to the circuit.

FIG. 22 depicts a partial block diagram and partial cross-sectional diagram of an embodiment of a system 2200 including a light-emitting diode 2202, and barrier element 2210, and a substrate 2216 with multiple photo detectors 2206 and 2208 and a barrier element 2212. Light-emitting diode 2202 illuminates object 2220, which reflects light back toward the substrate 2216. Some of the reflected light reaches photo detector 2206 and some of the reflected light is blocked by barrier element 2212.

Figure 23:
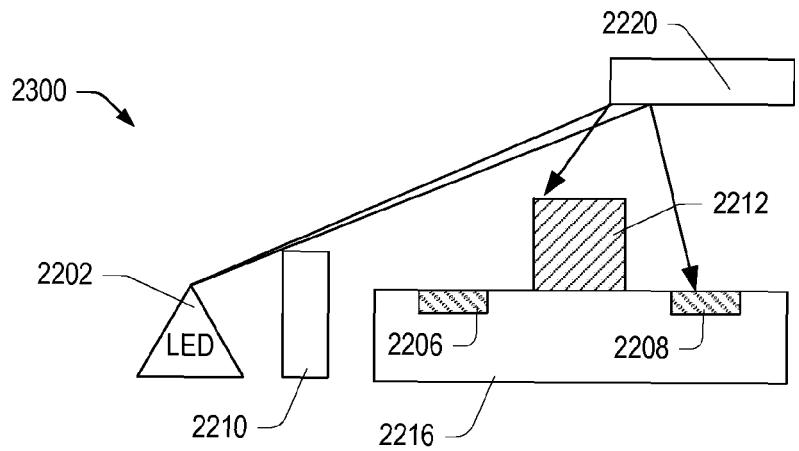

FIG. 23 depicts a partial block diagram and partial cross-sectional diagram of a system 2300, which is the system 2200 with the object 2220 moved to a position that is partially over and partially to the right of barrier element 2212. In this example, light-emitting diode 2202 illuminates object 2220, which reflects some of the light toward substrate 2216. Some of the reflected light reaches photo detector 2208 and some is blocked from reaching photo detector 2206 by barrier element 2212.

Figure 24:
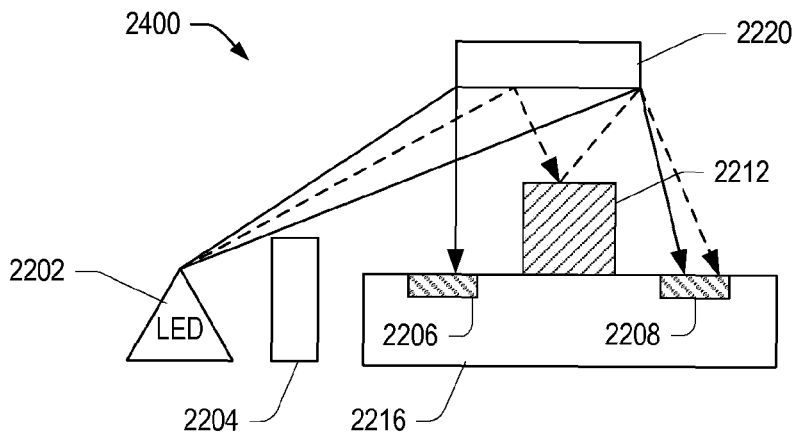

FIG. 24 depicts a partial block diagram and partial cross-sectional diagram of a system 2400, which is the system 2200 with the object 2220 moved to a position that is substantially over the barrier element 2212. Depending on the material properties of the barrier element 2212, the barrier element 2212 blocks some of the reflected light from reaching the substrate 2216. In this example, barrier element 2212 is partially reflective, causing some of the reflected light from object 2220 directed onto barrier element 2212 to be reflected back toward the object 2220 (as indicated by the dashed lines). Barrier element 2212 blocks at least a portion of the light reflected by object 2220 from reaching photo detector 2208 and redirects some of the light toward object 2220, which again reflects it toward substrate 2216. The thrice reflected light received at photo detector 2208 may be substantially attenuated by the reflections and/or may contribute less light energy than the ambient light.

Figure 25:
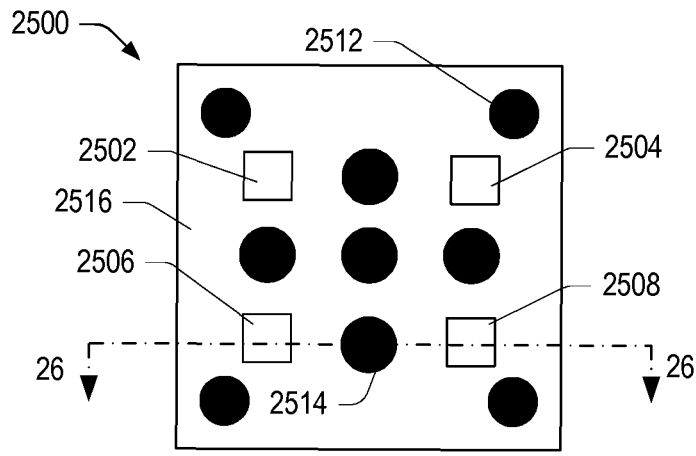
FIG. 25 is a top view of a portion of a circuit including a substrate with multiple photo detectors and an optical barrier.

FIG. 25 is a top view of a portion of a circuit 2500 including a substrate 2516 with multiple photo detectors 2502, 2504, 2506, and 2508 and a plurality of barrier elements, such as barrier elements 2512 and 2514. In this instance, barrier elements 2512 and 2514 are solder bumps formed on the substrate 2516 and may electrically connect to another circuit. Additionally, barrier elements 2512 and 2514 interfere with reflected light, producing a non-uniform, spatially-dependent reflectance pattern.

Figure 26:
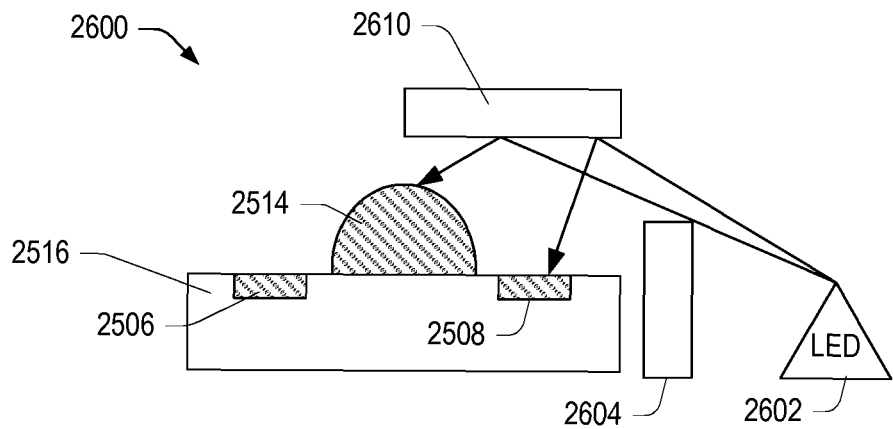
FIG. 26 is a partial block diagram and a partial cross-sectional diagram of a system including the circuit of FIG. 25, taken along line 26-26 in FIG. 25.

FIG. 26 is partial block and partial cross-sectional diagram of a system 2600 including a light-emitting diode 2602, a first barrier element 2604, an object 2610, and a cross-sectional view of circuit 2500 of FIG. 25, taken along line 26-26. Substrate 2516 includes photo detectors 2506 and 2508 and a barrier element 2514, which is implemented as a solder bump. In the illustrated example, light-emitting diode 2602 emits light that passes through the first barrier element 2604. Object 2610 reflects the light toward substrate 2516. Photo detector 2508 receives some of the reflected light and barrier element 2514 blocks some of the reflected light from receiving photo detector 2506.

While the above-examples depicted a single light source (light-emitting diode) and multiple photo detectors, it is also possible to use multiple light sources and one or more photo detectors. An example of a system that uses multiple light-emitting diodes and a single photo detector for determining proximity and movement of an object is described below with respect to FIG. 27.

Figure 27:
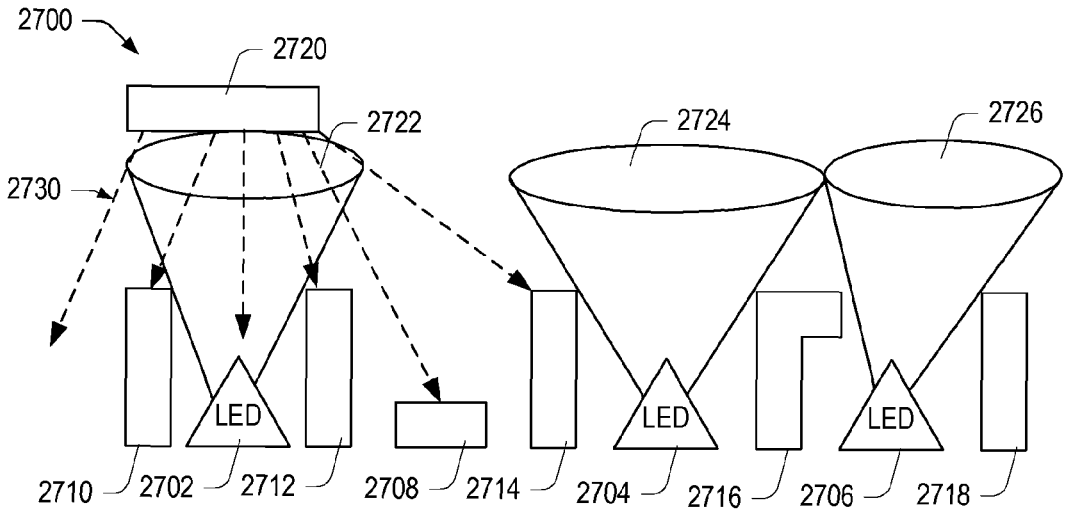
FIG. 27 is a block diagram of an embodiment of a system including multiple light sources separated from each other and from a single photo detector by optical barriers.

FIG. 27 is a block diagram of an embodiment of a system 2700 including multiple light-emitting diodes 2702, 2704, and 2706 and a photo detector 2708. Light-emitting diodes 2702, 2704, and 2706 separated from one another and from photo detector 2708 by barrier elements 2710, 2712, 2714, 2716, and 2718. The barrier elements 2710 and 1712 define an illuminated region 2722. Similarly, barrier elements 2714 and 2716 cooperate to define an illuminated region 2724, and barrier elements 2716 and 2718 cooperate to define an illuminated region 2726. In this example, barrier element 2716 includes a horizontal component that partially closes an opening over light-emitting diode 2706 to reduce the size of the illuminated region 2726, reducing or eliminating overlap between adjacent illuminated regions.

In the illustrated example, illuminated region 2722 illuminates object 2720, which reflects light depicted by dashed arrows 2730 toward the light-emitting diode 2702, toward photo detector 2708, and toward barrier elements 2710, 2712, and 2714. An associated control circuit, such as control circuit 118 sequentially activates light-emitting diodes 2702, 2704, and 2706 and measures reflected light using photo detector 2708. Photodetector 2708 may be realized as an array of photo detectors separated by optical barriers as described earlier.

In the above-examples, the barrier elements define optical detection regions, which produce non-uniform reflectance patterns on a surface of a substrate that includes one or more photo detectors. Examples of how proximity and movement of an object can be determined from such non-uniform reflectance patterns are described below with respect to FIGS. 28-30.

Figure 28:
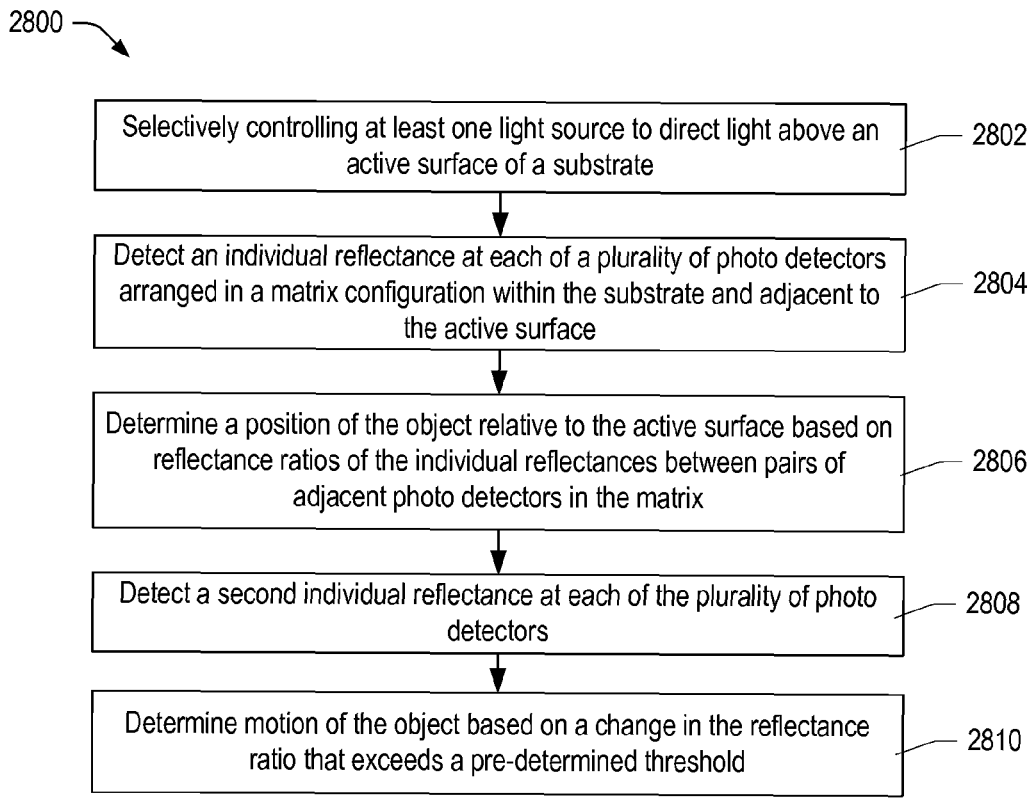
FIG. 28 is a flow diagram of an embodiment of a method of determining motion of an object based on a change in a reflectance ratio.

FIG. 28 is a flow diagram of an embodiment of a method 2800 of determining motion of an object based on a change in a reflectance ratio. At 2802, a controller, such as control circuit 118 in FIG. 1, selectively controls at least one light source to direct light above an active surface of a substrate. The active surface of the substrate includes one or more photo detectors. When multiple photo detectors are used, the photo detectors are arranged in a matrix separated by barrier elements designed to produce a non-uniform reflectance pattern from light reflected by an object. Advancing to 2804, each of the photo detectors detects a reflectance associated with an object proximate to the active surface, where the photo detectors are arranged in a matrix configuration within the substrate adjacent to the active surface. Barrier elements above the active surface interfere with the reflectances, producing a non-uniform reflectance pattern.

Continuing to 2806, the controller determines a position of the object relative to the active surface based on reflectance ratios of the reflectances between pairs of adjacent photo detectors in the matrix. In an example, a first photo detector (PD1) measures a reflectance ($R_1[N]$) at a first time (N) and a second photo detector (PD2) measures a second reflectance ($R_2[N]$), associated with the first time (N). The ratio of the first and second reflectances ($R_1[N]/R_2[N]$) represents proximity of the object relative to the first and second photo detectors.

Moving to 2808, the controller determines a second reflectance at each of the plurality of photo detectors. The second reflectances represent the reflected light from the object at a next time slot (N+1). In an example, the controller turns off the light source for a brief period of time and then turns it on again, providing a blanking interval before detecting the reflectances from the object at the next time slot. In this instance, the first photo detector (PD1) measures a reflectance ($R_1[N+1]$) and the second photo detector (PD1) measures a reflectance ($R_2[N+1]$). The ratio of the first and second reflectances at this next time slot represents a next position of the object relative to the active surface.

Continuing to 2810, the controller determines the motion of the object based on a change in the reflectance ratios that exceed a pre-determined threshold. For example, the ratios at time (N) and time (N+1) are subtracted to determine a difference, and the controller compares the difference to a positive threshold and a negative threshold (or compares an absolute value of the difference to a threshold) if the difference exceeds the positive threshold or is less than the negative threshold, the difference indicates motion of the object.

In an example, if the difference of the first and second reflectance ratios is less than the negative threshold, the object has moved away from the second photo detector toward the first photo detector. If the difference is greater than the positive threshold, the object has moved away from the first photo detector and toward the second photo detector. If the difference is greater than the negative threshold and less than the positive threshold, the object has not moved appreciably. In this latter instance, the relative movement of the object may be insufficient for the controller to interpret the motion as user input, for example.

Using ratios of reflectances, as opposed to changes in the absolute reflectance values, provides immunity not only for ambient-induced changes but also for differences in an object's reflectivity. In particular, ambient light changes will be detected at multiple photo detectors, causing a consistent gain across multiple photo detectors and making such changes relatively easy to detect and to filter out. The ratios substantially normalize such gains, allowing changes to continue to be detected even when exposed to significant noise. The relative changes in measured ambient from multiple photo detectors can be used to differentiate motion from ambient light, making it possible to use the photo detector matrix in either active or passive (ambient) detection systems.

Figure 29:
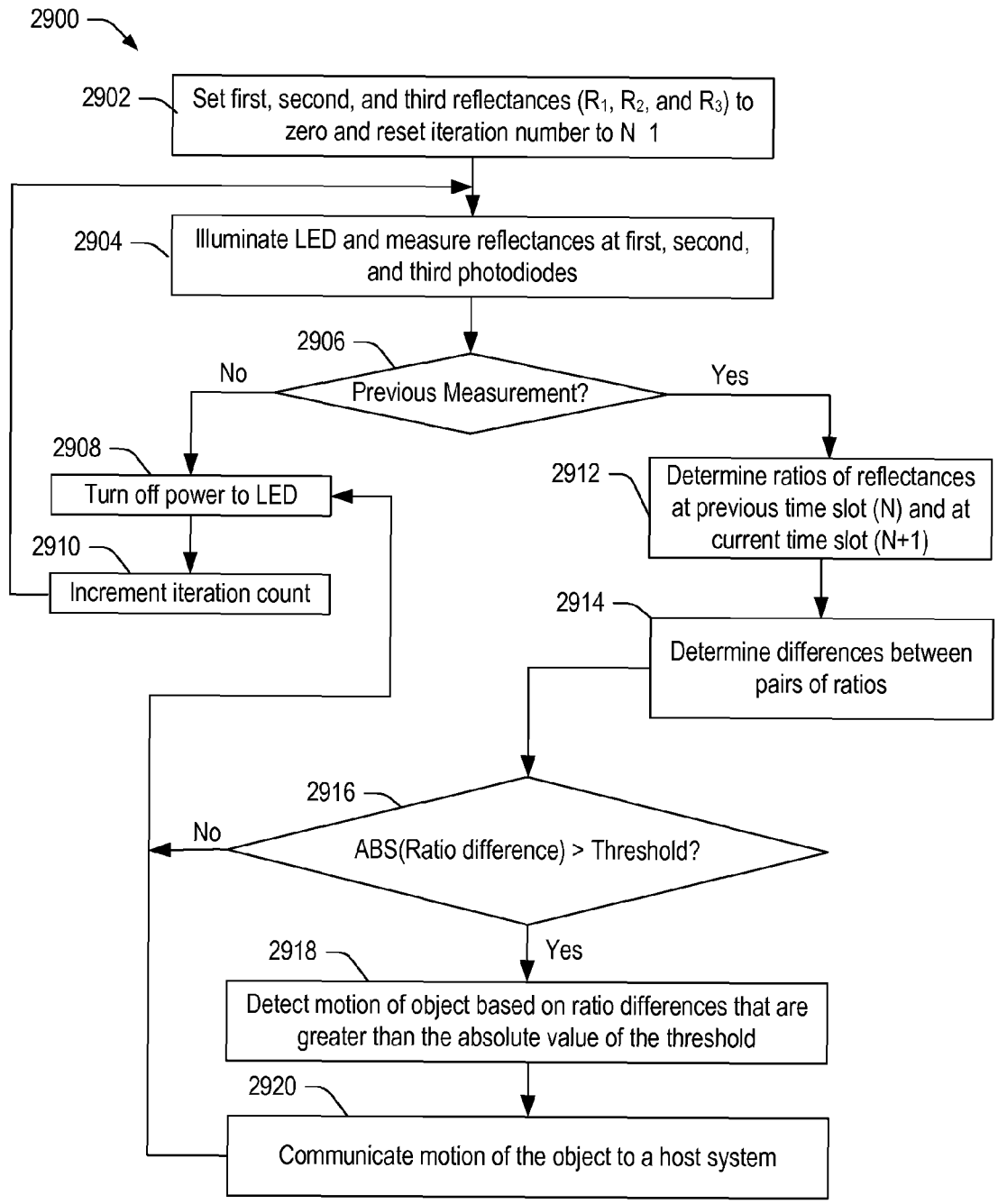
FIG. 29 is a flow diagram of a second embodiment of a method of determining motion of an object based on a reflectance ratio.

FIG. 29 is a flow diagram of a more detailed example of a method 2900 of determining motion of an object based on a reflectance ratio. At 2902, first, second, and third reflectances ($R_1$, $R_2$, and $R_3$) are set to zero and the reset iteration number is set to one (i.e., N=1). Advancing to 2904, an LED is illuminated and the first, second, and third photo detectors measure reflectances. Moving to 2906, if there were no prior reflectance measurements, the method advances to 2908 and power is turned off to the LED 2908. The method 2900 proceeds to 2910 and the iteration count is incremented. The method 2900 then returns to 2904 and the LED is once again illuminated and first, second, and third photo detectors measure their respective reflectances.

Returning to 2906, if a previous measurement has been taken, the method advances to 2912 and the ratios of reactances at a previous time slot (N) and at a current time slot (N+1) are determined. In an example, the controller determines a reflectance ratio between the first and second photo detectors for the previous time slot (N), i.e., $R_1[N]/R_2[N]$. Further, the controller determines the reflectance ratio between the first and second photo detectors for the next time slot (N+1), i.e., $R_1[N+1]/R_2[N+1]$.

Moving to 2914, the controller determines differences between pairs of ratios, such as between the first and second photo detectors, the first and third photo detectors, and the second and third photo detectors. In one example, the difference between the ratios of the first and second photo detectors at the different time slots is determined according to the following equation:

$$\text{Ratio Difference} = \frac{R_1[N]}{R_2[N]} - \frac{R_1[N+1]}{R_2[N+1]} \qquad (1)$$

Advancing to 2916, if the absolute value of the ratio difference (ABS(Ratio Difference)) is not greater than a threshold value, the method returns to 2908 and the LED is turned off. Otherwise, at 2916, if the absolute value of the ratio difference is greater than the threshold value, the method proceeds to 2918 and the controller detects the motion of the object based on the ratio differences that are greater than the threshold. Continuing to 2920, the controller communicates data related to the motion of the object to a host system.

In an example, the substrate with the multiple photo detectors and the controller can be incorporated in a system, such as a mobile telephone or computing, system. Upon detection of motion of the object, the controller communicates data to a processor of the host system, such as a processor within the mobile telephone or the computing system, which can use the data to determine a user input based on the detected motion. A more detailed example of block 2918 is described below with respect to FIG. 30.

Figure 30:
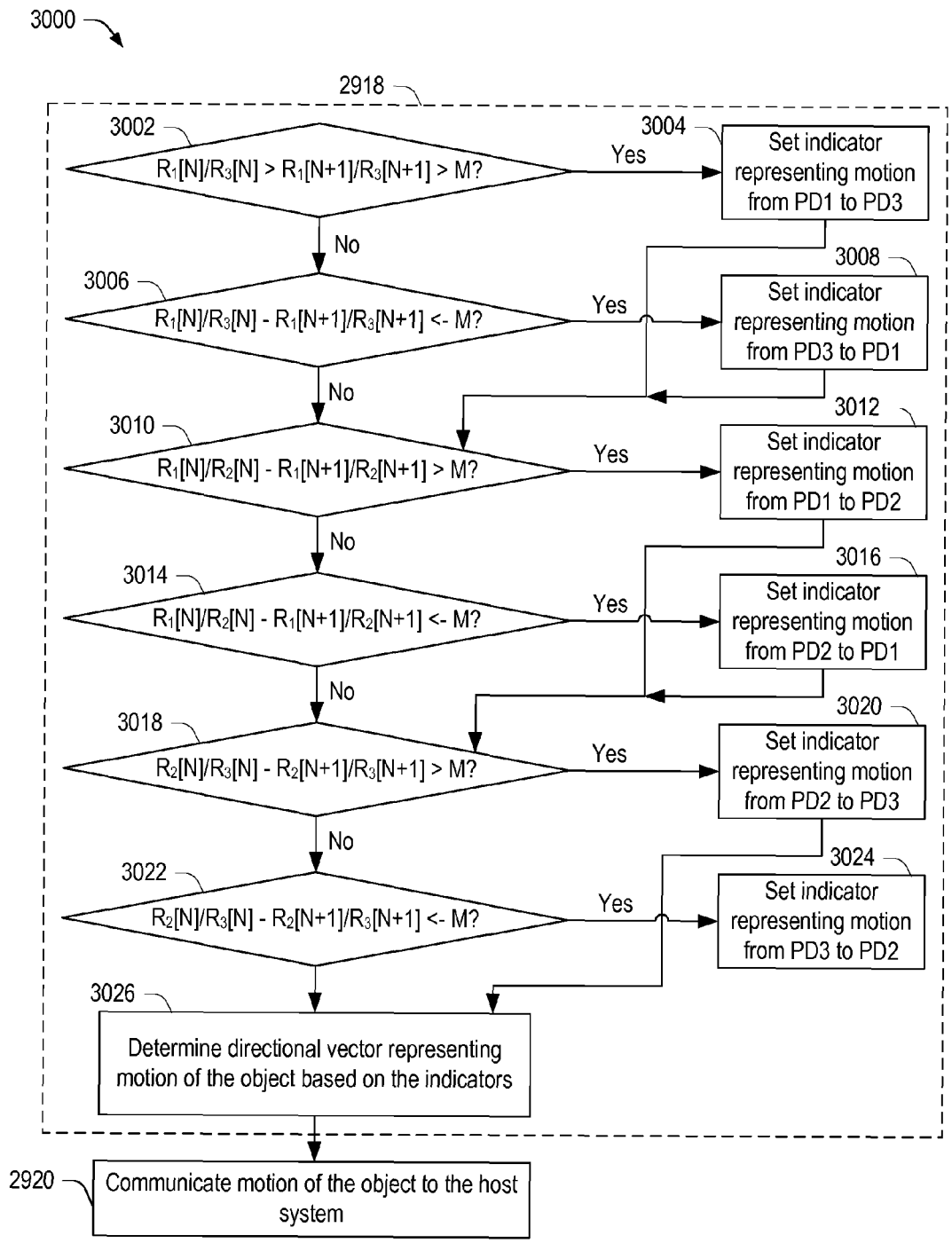
FIG. 30 is a detailed flow diagram of a portion of the method of FIG. 29.

FIG. 30 is a detailed flow diagram of a method 3000 detailing a portion of the method 2900 of FIG. 29. The method 3000 includes block 2918 for detecting the motion of the object based on the ratio differences that are greater than the threshold.

At 3002, if a first ratio difference is greater than a threshold, the method 3000 advances to 3004, and an indicator is set representing motion of the object away from the first photo detector and toward the third photo detector. The first ratio difference is determined according to the following equation:

$$\text{Ratio}_1 = \frac{R_1[N]}{R_3[N]} - \frac{R_1[N+1]}{R_3[N+1]} \qquad (2)$$

If the first difference ratio is greater than a threshold (M), i.e., (Ratio$_1$>M) where M is a pre-determined threshold, the indicator is set at 3004. The method 3000 then proceeds to 3010.

Returning to 3002, if the first ratio difference is less than the threshold, the method 3000 advances to 3006, and the first ratio difference is compared to a negative threshold. In particular, if the object moves away from the third photo detector toward the first photo detector, the first ratio difference (Ratio$_1$) will have a negative value, which is compared to a negative threshold. If the first ratio difference is less than the negative threshold, the method 3000 advances to 3008 and an indicator is set representing motion away from the third photo detector toward the first photo detector. The method 3000 proceeds to 3010.

At 3010, if a second ratio difference (Ratio$_2$) is greater than the threshold, the method 3000 advances to 3012 and an indicator is set representing motion away from the first photo detector and toward the second photo detector. The method then advances to 3018. The second ratio difference is determined according to the following equation:

$$Ratio_2 = \frac{R_1[N]}{R_2[N]} - \frac{R_1[N+1]}{R_2[N+1]} \quad (3)$$

Returning to 3010, if the second ratio difference is less than the negative threshold, the method 3000 advances to 3014 and the second ratio difference is compared to the negative threshold. If the second ratio difference is less than the negative threshold, the method advances to 3016 and the indicator representing motion from the second photo detector to the first photo detector is set. The method then proceeds to 3018.

At 3018, if a third ratio difference (Ratio$_3$) is greater than the threshold, the method 3000 advances to 3020 and an indicator is set representing motion away from the second photo detector and toward the third photo detector. The method then advances to 3026. The third ratio difference is determined according to the following equation:

$$Ratio_3 = \frac{R_2[N]}{R_3[N]} - \frac{R_2[N+1]}{R_3[N+1]} \quad (4)$$

Returning to 3018, if the third ratio difference is less than the threshold, the method 3000 advances to 3022 and the third ratio difference is compared to the negative threshold. If the third ratio difference is less than the negative threshold, the method advances to 3024 and the indicator representing motion from the third photo detector to the second photo detector is set. The method then proceeds to 3026.

At 3026, the controller determines a directional vector representing motion of the object based on the various indicators. In an example, the relative motion of the object is determined based on the magnitudes of the differences in the three directions. If more photo detectors are present in the matrix, the control circuit can determine the directional vector with greater specificity. The method 3000 continues to 2920, as also depicted in FIG. 29, and the motion of the object is communicated to the host system.

The methods described above with respect to FIGS. 28-30 represent examples of methods that can be implemented by the controller to detect the motion of the object relative to the substrate. In an alternative example, the motion can be determined according to another sequence of comparisons. In one possible example, motion away from the first photo detector toward the second photo detector can be determined when a first reflectance ratio (R$_1$[N]/R$_2$[N]) is greater than a threshold and when a second reflectance ratio (R$_1$[N+1]/R$_2$[N+1]) is greater than the threshold. If one or both of the ratios is less than the threshold, the method advances to another comparison.

In some instances, different positive and different negative thresholds can be used to compare the various reflectance ratio differences (or, in the alternative example, the various reflectance ratios). Additionally, while the decision blocks 3002, 3006, 3010, 3014, 3018, and 3022 are depicted as occurring sequentially, in some instances, the ratio calculations and the decisions are performed substantially in parallel. Further, while, in some instances, only three photo detectors and their associated reflectances are shown, the substrate can include any number of photo detectors. In some instances, increasing the number of photo detectors improves overall resolution of the device.

In conjunction with the systems, circuits, and methods described above with respect to FIGS. 1-30, a circuit includes multiple photo detectors adjacent to an active surface and includes an optical obstruction configured to define anon-uniform reflectance pattern on the active surface, providing optical detection regions associated with each of the photo detectors. A control circuit determines proximity of an object using ratios of reflectances between pairs of the photo detectors. The control circuit determines motion of the object by determining a difference between the ratios over time and by comparing the difference to one or more thresholds. The control circuit detects motion of the object in response to the absolute value of the difference exceeding a threshold. The relative direction of motion is determined based on the sign (positive or negative) of the difference.

Although the present invention has been described with reference to preferred embodiments, workers skilled in the art will recognize that changes may be made in form and detail without departing from the scope of the invention.

What is claimed is:

1. A system comprising:
   a plurality of photo detectors, each of the plurality of photo detectors configured to generate signals proportional to incident light;
   an optical barrier configured to partially obstruct reflected light from reaching the plurality of photo detectors to produce a spatially dependent reflectance pattern that is dependent on a position of an object relative to a substrate; and
   a control circuit configured to determine a position of the object during a reflectance measurement cycle using each of the plurality of photo detectors, the control circuit to:
   calibrate each of the plurality of photo detectors to ambient light conditions;
   measure ambient plus reflected light using each of the plurality of photo detectors;
   correct the ambient plus reflected light based on the ambient light conditions to determine the reflected light received by each of the plurality of photo detectors; and
   detect the position of the object based on a ratio of the reflected light received by at least two of the plurality of photo detectors.

2. The system of claim 1, wherein the control circuit is further configured to iteratively repeat the reflectance measurement cycle and to detect motion of the object in response to a change in the ratio over time.

3. The system of claim 2, wherein the control circuit iteratively measures the ambient light and the ambient plus reflected light at each of the plurality of photo detectors to determine the reflected light during each repetition of the reflectance measurement cycle.

4. The system of claim 1, wherein, to calibrate and measure using each of the plurality of photo detectors, the control circuit is configured to:
   select a photo detector of the plurality of photo detectors;
   measure the ambient light using the photo detector;
   activate a light source;
   measure the ambient plus reflected light using the photo detector; and
   turn off the light source; and
   select a next photo detector for repeatedly measuring the ambient light and the ambient plus reflected light.

5. The system of claim 1, wherein the control circuit differentiates light variations due to motion of the object versus bulk ambient changes.

6. The system of claim 1, wherein the optical barrier comprises multiple barrier elements arranged in a pattern to produce the spatially dependent reflectance pattern.

7. The system of claim 6, wherein the pattern comprises:
a first portion extending in a first direction; and
a second portion extending in a second direction that is substantially perpendicular to the first direction.

8. A circuit comprising:
a plurality of photo detectors, the plurality of photo detectors configured to generate electrical signals based on received light including at least one of ambient light and light variations caused by an object moving proximate to a substrate;
an optical barrier configured to optically isolate at least one photo detector of the plurality of photo detectors from another photo detector of the plurality of photo detectors, the optical barrier adapted to produce a non-uniform reflectance pattern over the plurality of photo detectors from the light variations caused by the object; and
a control circuit coupled to the plurality of photo detectors to receive the electrical signals, determine the light variations from the electrical signals, and determine a change in position of the object based on variation ratios of the light variations received by pairs of photo detectors of the plurality of photo detectors in response to determining the light variations.

9. The circuit of claim 8, wherein the control circuit is configured to:
select one of the plurality of photo detectors;
deactivate a light source;
receive a first electrical signal from the one of the plurality of photo detectors, the first electrical signal corresponding to the ambient light;
activate the light source;
receive a second electrical signal from the one of the plurality of photo detectors, the second electrical signal corresponding to ambient light plus light variations; and
determine the light variations at the one of the plurality of photo detectors based on a difference between the first electrical signal and the second electrical signal.

10. The circuit of claim 9, wherein the control circuit is further configured to:
iteratively select from the plurality of photo detectors;
iteratively deactivate and activate the light source; and
iteratively receive the first electrical signal, receive the second electrical signal, and determine the light variations at each of the plurality of photo detectors.

11. The circuit of claim 8, wherein each of the plurality of photo detectors receives the light such that the light variations received by the photo detector are spatially dependent on the position of the object relative to the substrate.

12. The circuit of claim 8, wherein the control circuit is configured to detect motion of the object when an absolute value of a change in one or more of the variation ratios exceeds a threshold.

13. The circuit of claim 8, wherein the control circuit differentiates light variations due to motion of the object versus bulk ambient changes.

14. The circuit of claim 8, wherein the optical barrier extends in a direction that is substantially perpendicular to a surface of the substrate.

15. The circuit of claim 8, wherein the optical barrier is formed on a surface of the substrate.

16. The circuit of claim 8, wherein the optical barrier includes at least a portion that is formed on a transparent package deposited over the substrate.

17. The circuit of claim 8, wherein the optical barrier includes at least a portion that comprises opaque ink that is printed in a pattern above a surface of the substrate.

18. The circuit of claim 8, wherein the optical barrier comprises a plurality of barrier elements that are arranged to form at least one of an intersecting line pattern, a parallel line pattern, a ring pattern, a rectangular pattern, and an arc pattern.

19. A system comprising:
a substrate including an active surface;
a light-emitting diode configured to emit light above the active surface;
a plurality of photo detectors disposed in the substrate adjacent to the active surface,
an optical barrier adjacent to the active surface and configured to produce a spatially dependent reflectance pattern over the plurality of photo detectors based on reflectance of light by an object, the optical barrier configured to optically isolate at least one photo detector from at least one other photo detector of the plurality of photo detectors; and
a control circuit configured to control activation of the light-emitting diode and to sequentially sample incident light with the light-emitting diode deactivated and a reflectance with the light-emitting diode activated using each photo detector of the plurality of photo detectors, the control circuit to determine position of an object relative to the substrate based on ratios of reflectances between adjacent photo detectors of the plurality of photo detectors.

20. The system of claim 19, wherein the control circuit is configured to detect motion of the object in response to a change in one of the ratios of reflectances over time.

21. The system of claim 19, wherein the plurality of photo detectors detect reflected light in a respective plurality of optical detection regions defined in part by the optical barrier.

22. The system of claim 19, wherein the optical barrier comprises a plurality of barrier elements that defines a pattern including at least one of a concentric ring pattern, a concentric arc pattern, and a rectangular pattern.

* * * * *